Aug. 11, 1931.   W. ERNST   1,818,611
RADIAL PUMP
Filed May 21, 1927   3 Sheets-Sheet 2
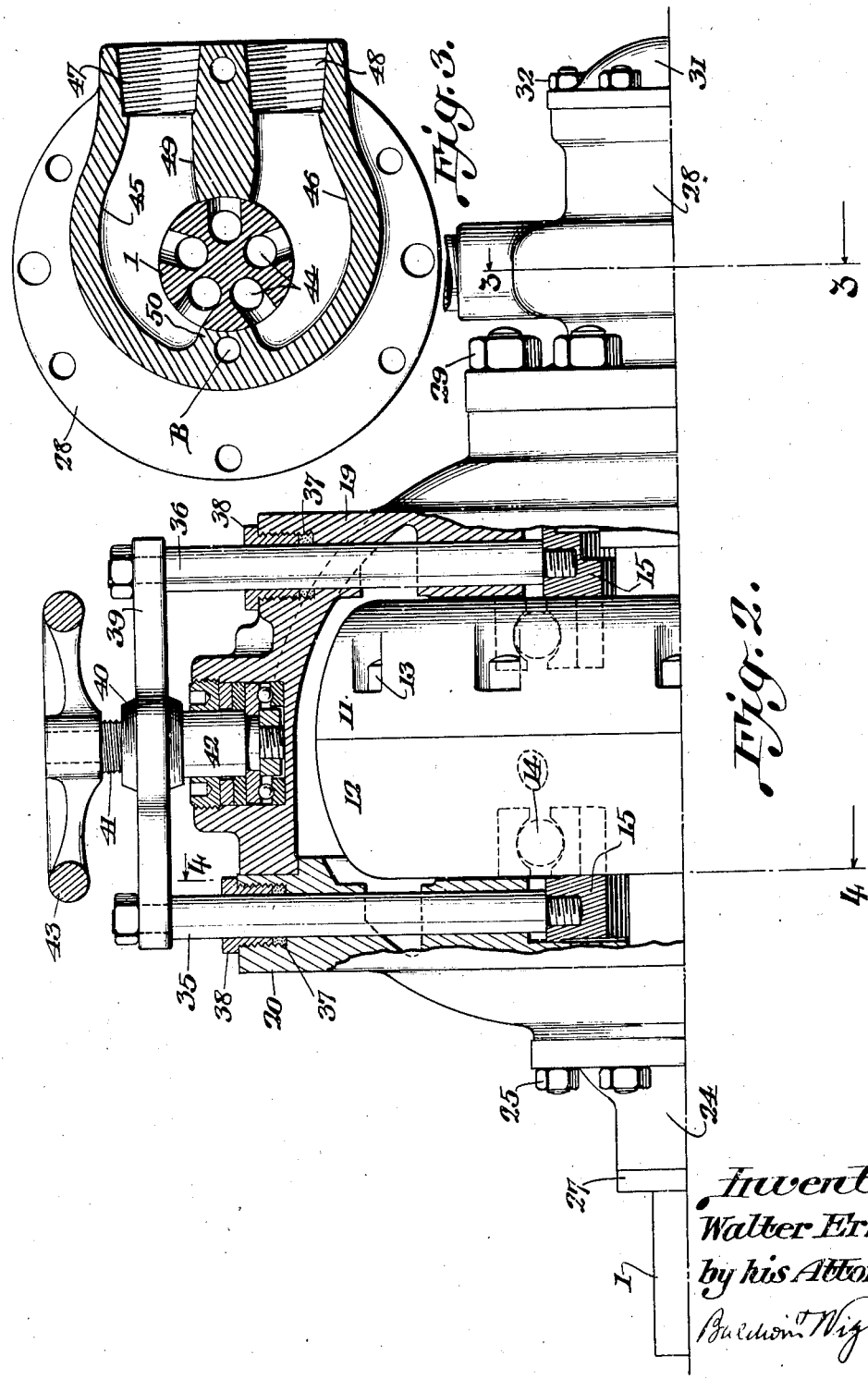
Inventor
Walter Ernst
by his Attorneys

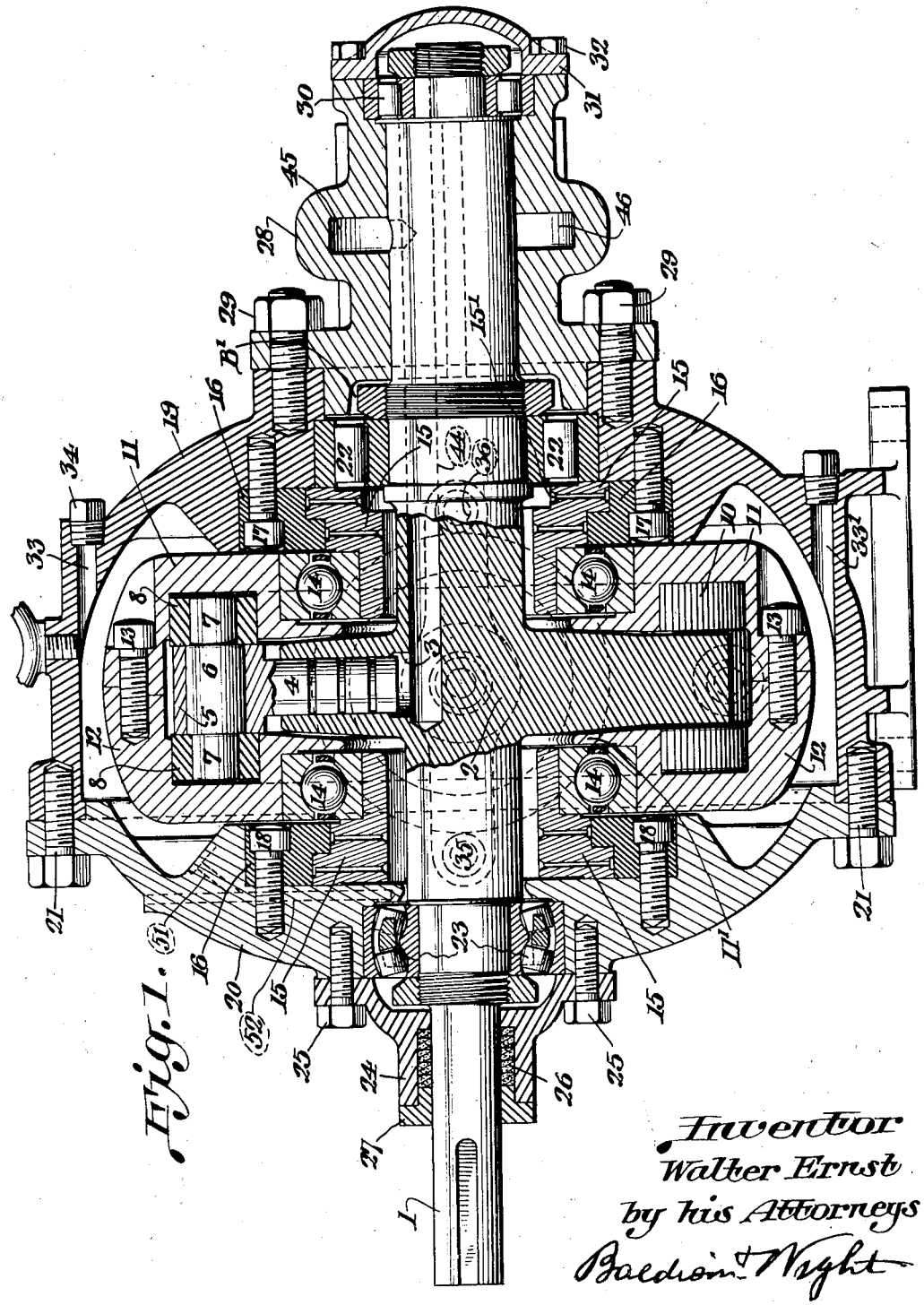

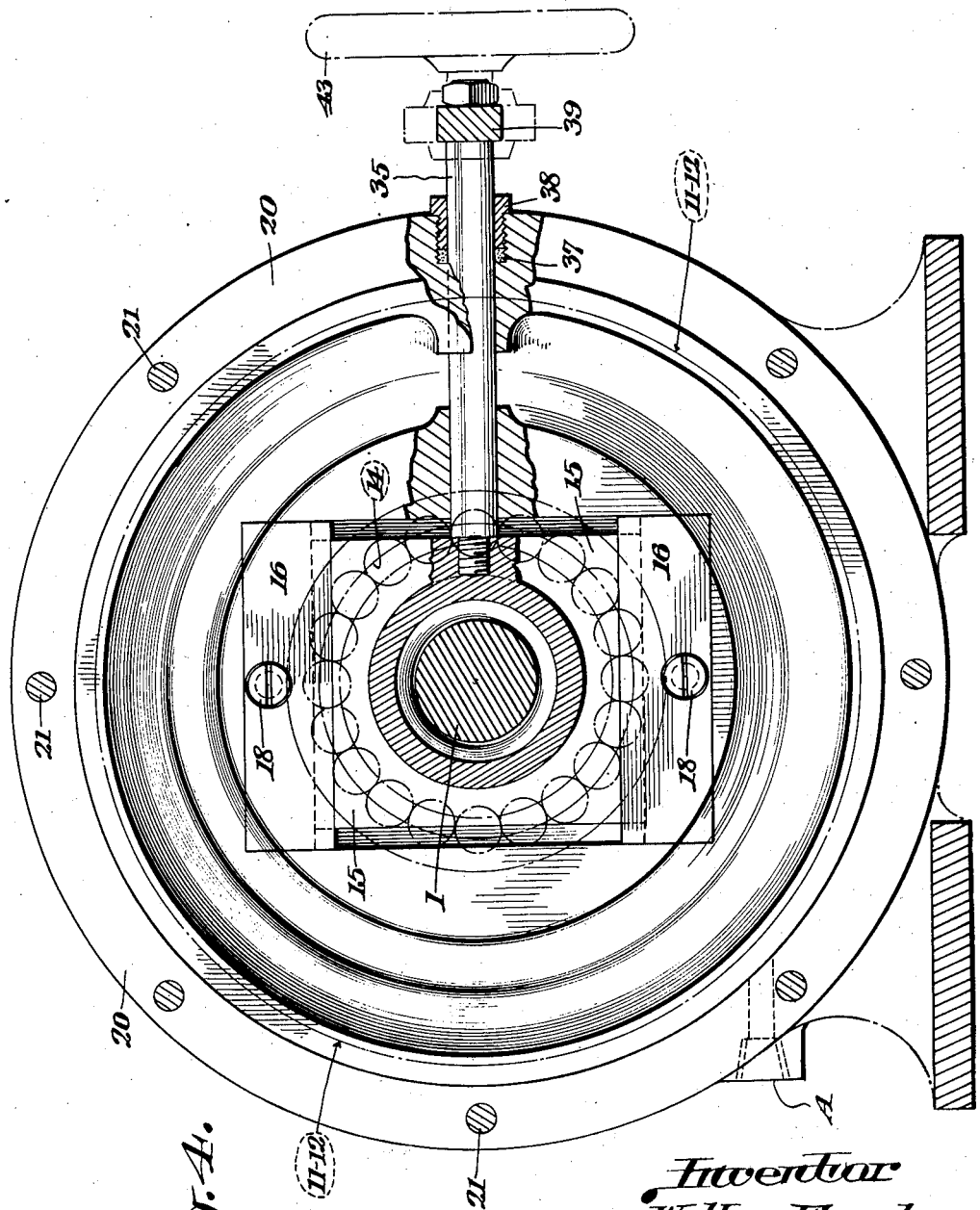

Patented Aug. 11, 1931

1,818,611

UNITED STATES PATENT OFFICE

WALTER ERNST, OF MOUNT GILEAD, OHIO, ASSIGNOR TO THE HYDRAULIC PRESS MANUFACTURING COMPANY, OF MOUNT GILEAD, OHIO

RADIAL PUMP

Application filed May 21, 1927. Serial No. 193,320.

This invention relates to that type of pump or motor in which radial pistons carried by the rotating part are given to and fro movement, the direction and amount of flow being determined by an eccentric adjustment of a cooperating part. The object of the invention is to simplify and improve the construction, particularly by arranging the fluid passages which communicate with the cylinders in which the pistons reciprocate within the rotatable shaft itself. Simple and efficient means is also provided for adjusting the eccentricity in order to vary the amount of discharge and the direction thereof.

Other details will be evident from the following description and the appended claims.

In the drawings:

Figure 1 is a vertical longitudinal section through the pump.

Figure 2 is a partial top plan view with parts in section and parts broken away.

Figure 3 is a section on the line 3—3 of Figure 2.

Figure 4 is a section on the line 4—4 of Figure 2.

The shaft 1 of the pump has a central enlarged hub 2 which is provided with a plurality of radial cylinders 3. The number of cylinders may be varied as desired but five are employed in the present construction. In each cylinder is a piston 4 which has an enlarged outer end 5 and carries a wrist pin 6 of throme nickel steel which is hardened and ground. This pin has portions 7 projecting at either side thereof and these carry sliding blocks or shoes 8, which are mounted in peripheral grooves 10 which are formed in rings 11 and 12. These rings are fastened together tightly by screws 13. They are carried on roller bearings 14 which in turn are mounted on rings 15 which are slidably mounted in guides 16 as clearly shown in Figures 1 and 4. The guides 16 at one side are fastened by screws 17 to a pump casing 19 while the guides 16 at the other side are fastened by similar screws 18 to a cover member 20 which is attached to the casing member 19 by screws 21.

Roller bearings 22 are interposed between the casing member 19 and the shaft and roller bearings 23 which may be of any desired type but are illustrated as two sets of rollers with a retaining ring interposed between the cover 20 and the shaft 1.

A cap member 24 is attached to the cover member 20 by screws 25 and packing 26 is interposed between this member and the shaft 1 and held in position by a packing screw 27. At the other side a valve casing member 28 is fastened to the pump casing 19 by screws 29 and roller bearings 30 are provided between the outer end of this casing and the shaft 1. A cover 31 is provided to protect the end of the shaft and roller bearings 30 and this is held to the casing 28 by means of screws 32. An upper passage 33 in the pump casing allows air to escape which accumulates in the pump and must be removed when starting. The lower passage 33' serves to completely drain the pump casing of oil. These passages may be closed with screw plugs 34. A pipe tap A is always open and this determines the height of the oil level during the operation of the pump. This tap may communicate by means of a pipe line to a pump.

As shown in Figures 2 and 4, rods 35 and 36 are connected at their inner ends to the adjustable rings 15. The rod 36 is guided in casing member 19 and packing 37 held in place by a packing screw 38 provided therefor. The rod 35 is similarly mounted in the cover member 20. Outside of the casing the rods 35 and 36 are connected by a cross bar 39 having an enlarged internally threaded hub 40 into which threads a portion 41 of a member having its inner end 42 attached to the casing 19 by a double thrust bearing which permits its rotation. The outer end of this member is provided with a hand wheel 43 by means of which the cross bar 39, rods 35 and 36, and rings 15 with the parts carried thereby can be adjusted within the guides 16.

Although the shaft 1, cylinders 3, pistons 4, and the rings 11 and 12 all rotate together, the peripheral speed of the shoes 8 will be varied according to the adjusted position of the rings 15. The effective operation of the pistons 4 and the extent of their movement can be adjusted as desired to determine not only the direction of discharge of fluid but the amount thereof. So far as this feature is concerned, the construction herein shown follows old and well known principles and no further description thereof appears necessary.

To the right of the hub portion of the shaft 1, the shaft is provided with a plurality of longitudinal passages 44, there being one passage for each cylinder 3, the inner end of each passage being in constant communication with the inner end of one of the cylinders. As shown particularly in Figure 3, the valve member 28 is provided with two chambers 45 and 46 to which pipes may be connected at 47 and 48 respectively. Inwardly extending projections or portions 49 and 50 of the valve casing are provided with land spaces contacting with the shaft, thus serving to separate the space between the casing and the shaft into the chambers 45 and 46 which lie in the same plane. Each of the passages 44 opens at its outer end to the outside of the shaft so as to communicate with the valve chambers 45 and 46, successively upon rotation of the shaft. It is to be noted that the parts 49 and 50 afford land spaces and these are so arranged that when one of the outlet openings is covered by the land space, the corresponding piston will be in dead center. The port is shut off slightly before the piston reaches dead center but the length of the column of liquid between this port and the cylinder allows for enough compression to be obtained without communicating a shock to the construction.

It will be obvious that if the rings 15 are in central position with relation to the axis of the shaft, a rotation of the shaft will produce no reciprocating motion of the pistons and there will be no discharge of fluid. If the rings 15 are adjusted to one side, one of the passages 47 or 48 will become an inlet passage while the other is an outlet. The stroke of the piston and consequently the amount of fluid discharged by the pump will depend upon the distance through which the rings 15 have been moved or the eccentricity of the rotating mechanism. If the ring 15 is moved in the opposite direction, the operation is merely reversed and if the passage 47 has previously been an inlet passage, it now becomes the outlet while the passage 48 changes from an outlet passage to an inlet passage.

It will be noted that the maximum stresses occur between the bearings 22 and 23 and that the valve is located at some distance from this point and the deflection in the valve itself is very small, thus allowing extremely close running clearance between the valve and rotor. In order to prevent air from being drawn into the clearance between the pistons 4 and the rotor 2, the rings 11 and 12 have extensions 11' which extend between the rotor 2 and bearing 14 and form a sort of an apron. By the action of centrifugal force the space between these aprons and adjacent parts will be filled with oil, thus producing a sufficient seal against air.

Whatever oil may leak between the rotor and the valve 28 will collect in the end chamber conjointly formed by the cap 31 and the extreme end of the portion of the shaft projecting beyond the pump casing at the right hand side thereof as viewed in Figure 1 until it substantially fills this chamber and then will escape to a longitudinal passage B, see Figure 3, so that the chamber is kept full of oil and the bearing 30 is properly lubricated. The oil escaping through the passage B together with the oil escaping through the clearance between valve and rotor on the left hand of the valve of Figure 1 will be thrown off violently into the narrow space B'. This forms an effective air seal for the valve 28. The oil thus thrown off will pass through the bearing 22, lubricating the same and being thrown off from the rotor shaft 2 will pass through the passages 15' in the blocks 15 lubricating the slides for this block. A passage 51 from the interior of the casing communicates with a vertical passage 52 through which oil passes to lubricate the bearing 23 and from this bearing the oil will pass to lubricate the left hand slide for the block 15. The space between the rings 11 and 12 is full of oil drawn off by centrifugal force which will lubricate the block 8. The pin 6 carries a heavy load and a passage is provided longitudinally through the piston 4 into the bore for pin 6 so that a certain amount of oil pumped under pressure will reach the pin and the amount of oil pressure on the pin will always be proportional to the load on the pin.

By reason of the projections 49 and 50, which divide the chambers 45 and 46, being located on the casing instead of the shaft, it is possible to employ any number of cylinders within the limits imposed by ordinary mechanical or designing considerations. By virtue of this arrangement, the successive communication of each passage 44 with the chambers 45 and 46 will be properly timed with respect to the movement of the associated piston. Although, in the present instance, a pump embodying five cylinders is disclosed, it will be readily understood that the advantages of providing the projections 49 and 50 on the casing as distinguishing from the shaft are important considerations in any pump of the kind described wherein more than two cylinders are employed.

It is obvious that various details of construction can be changed and particularly different means may be employed for shifting the rings 15. The various parts of the pump will be constructed by materials which appear to be most suitable for the purpose and the particular form of the device shown in the drawings is not to be regarded as limiting the invention but merely as being illustrative. In general it is to be understood that the invention is to be regarded as limited only by the scope of the appended claims.

I claim as my invention:

1. In a radial pump, the combination with a pump casing, of a shaft extending through the casing and projecting beyond one end thereof, spaced bearings carried by the casing and mounting the shaft for rotary movements therein, a hub on said shaft intermediate said bearings and provided with radial cylinders, reciprocable pistons in said cylinders, means engaging the outer ends of said pistons for guiding the latter, a valve casing removably secured to said pump casing and surrounding the projecting end of said shaft, said valve casing being provided with two separate valve chambers located on opposite sides of the shaft and longitudinal passages in said shaft communicating at their inner ends with said cylinders and being adapted to communicate at their outer ends successively with the respective chambers in said casing during rotation of the shaft.

2. In a radial pump, the combination with a pump casing, of a shaft extending through the casing and projecting beyond one end thereof, spaced bearings carried by the casing and mounting the shaft for rotary movements therein, a hub on said shaft intermediate said bearings and provided with radial cylinders, reciprocable pistons in said cylinders, means engaging the outer ends of said pistons for guiding the latter, a valve casing removably secured to said pump casing and surrounding the projecting end of said shaft, said valve casing being provided with two separate valve chambers located on opposite sides of the shaft, longitudinal passages in said shaft communicating at their inner ends with said cylinders and being adapted to communicate at their outer ends successively with the respective chambers in said casing during rotation of the shaft, said casing conjointly forming with the extreme end of the projecting portion of the shaft an end chamber for collecting fluid leaking from the valve chambers endwise of the shaft, and a passage in said valve casing communicating at one end with said end chamber and having its other end arranged to discharge fluid therefrom upon one of said bearings.

3. A radial pump comprising a rotatable shaft having a hub provided with more than two radial cylinders, pistons operating in said cylinders, means engaging the outer ends of the pistons for guiding the latter, means for adjusting said guiding means radially with respect to said shaft for varying the operation of said pistons, a passage extending from each cylinder in said shaft to a point near one end thereof where each passage is provided with a single port, a casing member surrounding this portion of the shaft in spaced relation thereto and provided with spaced inwardly extending projections having land spaces contacting with the shaft and dividing the space between the shaft and casing into two separate chambers with which said ports successively register during rotation of the shaft, each of said chambers being provided with an opening adapted to communicate with a pipe exterior of the casing.

4. A radial pump comprising a rotatable shaft having a hub provided with more than two radial cylinders, pistons operating in said cylinders, means engaging the outer ends of the pistons for guiding the latter, and means for adjusting said guiding means radially with respect to said shaft, a plurality of longitudinal passages in said shaft, one communicating with each cylinder and extending to a point near one end of the shaft, a casing surrounding this portion of the shaft in spaced relation thereto and provided with spaced inwardly extending projections having land spaces contacting with the shaft and dividing the space between the shaft and casing into two separate chambers, and a single port from each passage, said port registering with said chambers successively during the rotation of the shaft.

5. A radial pump comprising a rotatable shaft having a unitary hub provided with more than two radial cylinders, pistons working in said cylinders, means engaging the outer ends of the pistons for guiding them, means for varying the normal position of said guiding means, a casing into which a portion of said shaft extends and which surrounds this portion of the shaft in spaced relation thereto, inwardly extending projections on the casing having land spaces contacting with the shaft and dividing the space between the shaft and casing into two separate chambers disposed on opposite sides of the shaft and in the same plane, and longitudinal passages in the shaft communicating at their inner ends with the cylinders and being adapted to communicate at their outer ends with said two chambers successively.

6. In a radial pump, the combination with a pump casing, of a shaft extending through the casing and projecting beyond one end thereof, spaced bearings mounting the shaft for rotary movements in said casing, three or more cooperating cylinders and pistons carried by said shaft and said casing and disposed intermediate said bearings, a valve casing surrounding the projecting end of said shaft in spaced relation thereto and provided with two spaced inwardly extending projections having land spaces contacting with the shaft and dividing the space between the shaft and casing into two separate valve chambers located at opposite sides of the shaft and in the same plane and longitudinal passages in said shaft communicating at their inner ends with said cylinders and being adapted to communicate at their outer ends successively with the respective chambers in said casing during rotation of the shaft.

In testimony whereof, I have hereunto subscribed my name.

WALTER ERNST.